United States Patent
Nusbaum et al.

[11] 4,000,037
[45] Dec. 28, 1976

[54] REACTOR-TURBINE CONTROL FOR LOW STEAM PRESSURE OPERATION IN A PRESSURIZED WATER REACTOR

[75] Inventors: Michael S. Nusbaum, Placentia, Calif.; Vincent P. Buscemi, Pittsburgh; George J. Silvestri, Jr., Morton, both of Pa.

[73] Assignee: Westinghouse Electric Corporation, Pittsburgh, Pa.

[22] Filed: Nov. 28, 1973

[21] Appl. No.: 419,746

[52] U.S. Cl. .......................... 176/19 R; 176/20 R; 176/65
[51] Int. Cl.² ........................ G21C 17/00
[58] Field of Search ................. 176/19 R, 20 R, 65

[56] References Cited
UNITED STATES PATENTS

| | | | |
|---|---|---|---|
| 3,061,533 | 10/1962 | Shannon et al. | 176/20 R X |
| 3,255,084 | 6/1966 | Doroszlai | 176/20 R |
| 3,301,762 | 1/1967 | Dalgren | 176/65 |
| 3,341,421 | 9/1967 | Kagi | 176/20 R |
| 3,434,924 | 3/1969 | Pouderoux | 176/20 R |
| 3,660,229 | 5/1972 | Klingbeil et al. | 176/20 R |
| 3,700,552 | 10/1972 | Schluderberg | 176/20 R |
| 3,734,823 | 5/1973 | Brown et al. | 176/65 X |
| 3,748,229 | 7/1973 | Schill | 176/65 |
| 3,778,347 | 12/1973 | Giras et al. | 176/20 R |

Primary Examiner—Stephen C. Bentley
Assistant Examiner—Peter A. Nelson
Attorney, Agent, or Firm—G. H. Telfer

[57] ABSTRACT

A control system for a pressurized water reactor power plant. The control system comprises temperature sensing means having flow interruption means connected thereto. The temperature sensing means monitors the temperature levels within the reactor element and sends a predetermined signal to the flow interruption means upon a predetermined change in reactor temperature. The flow interruption means is disposed within an associated steam turbine loop including a steam generator element which transforms secondary water into steam to act as motive fluid within the turbine loop. The flow interruption means initiate one or more flow interruption activities which either produce an increased temperature differential between the secondary water and the steam produced therefrom or increase the rate of flow of steam within the associated steam turbine loop. Utilization of the control system permits extensive operation of the reactor element past the end of the normal fuel cycle life. In addition, the control system provides improved reactor load follow capability.

18 Claims, 5 Drawing Figures

REACTOR-TURBINE CONTROL FOR LOW STEAM PRESSURE OPERATION IN A PRESSURIZED WATER REACTOR

BACKGROUND OF THE INVENTION

1. Field of the Invention

This invention relates to nuclear steam turbine power plant controls, and in particular, to a power plant control system which permits operation beyond the normally defined end of the fuel cycle of the reactor element.

2. Description of the Prior Art

In a nuclear reactor power plant, heat energy generated within the nuclear reactor element is utilized to provide a source of pressurized dry and saturated or low superheat steam. The steam so produced drives an associated turbine system linked mechanically to an electrical generator which produces electrical energy for an associated electrical load. In general, there are two main classifications of nuclear power plants, the Boiling Water Reactor or BWR System, and the Pressurized Water Reactor, or PWR System.

The Boiling Water Reactor, or BWR, conducts a water coolant through a single closed loop comprising the reactor element and the turbine system. As the water coolant passes through the reactor core, heat taken from the reactor core raises the temperature of the water coolant above the vaporization point of the coolant, thereby producing steam. The steam is then directly passed through the turbine system and the heat energy within the steam is converted into useful mechanical energy. The steam passes into a condenser element and is returned to a liquid state. The condensate, now in the form of low temperature water coolant, is reintroduced as a coolant into the reactor element, thus completing the single closed loop.

However, since the water coolant and the steam produced therefrom are exposed to the highly radioactive reactor core and have undergone extensive bombardment of high energy neutron particles therein, the turbine system through which the radioactively contaminated steam has passed experiences an increase in radioactivity levels. Also, extreme care must be taken to prevent leakage of the contaminated steam or water out of the single, closed BWR loop.

On the other hand, power plants employing a Pressurized Water Reactor use a double closed loop arrangement for the production of electrical energy by use of the nuclear reactor element. The first, or primary, side connects the reactor element in a closed loop with a steam generator, or heat exchanger element. The water coolant is maintained under a high pressure, approximately 2200 p.s.i. and takes heat from the reactor core as the pressurized water coolant passes therethrough. Since the water coolant is under pressure, the heat taken from the reactor does not raise the temperature of the water coolant above the vaporization temperature for water at the appropriate pressure.

Instead, the heated, but not boiling, water enters the steam generator element. In the steam generator, the heat carried by the pressurized water coolant is transferred to secondary water disposed within the steam generator. The transfer of heat from the pressurized water to the secondary water sufficiently cools the pressurized water coolant to permit its reintroduction into the reactor core, thus completing the primary side loop.

Within the steam generator, heat taken from the pressurized water coolant and transmitted to the secondary water therein raises the temperature of the secondary water above its boiling point, thus producing steam. However, in the case of the PWR, the steam produced within the steam generator element is not radioactively contaminated since the pressurized water coolant is physically segregated from the secondary water in the steam generator element.

From the steam generator, the steam produced by the heating of the secondary water is conveyed through the second enclosed loop, called the secondary or steam side. The secondary or steam side comprises a high pressure turbine element, a low pressure turbine element, a condenser element, and a series of feedwater heater elements. Each turbine element has an inlet orifice of the predetermined size with the inlet orifice of the high pressure turbine being physically smaller than the inlet orifice of the low pressure turbine element. Steam passes through the turbine elements and converts the heat energy carried therein to mechanical energy. The expanded steam is returned to the liquid state in the condenser. The condensate is then reintroduced into the steam generator after passing through a series of feedwater heater elements to complete the second closed loop.

It is evident then, that the pressure of the steam flowing in the secondary loop is directly dependent upon the amount of heat transferred from the pressurized water coolant to the secondary water in the steam generator. If the temperature of the water coolant is high, a greater amount of heat energy will be transferred to the secondary water than would occur if the primary water coolant were at a lower temperature. The heat energy transferred to the secondary water thus raises the temperature of a greater volume of secondary water above the applicable vaporization temperature of the secondary water, thus producing more steam in the secondary loop. Steam flow through the secondary or steam side loop is dependent upon the physical sizing of the high pressure turbine inlet orifice.

The heat content of the primary water coolant is obviously dependent upon the heat output in the reactor core. Heat output in the reactor core is in turn dependent upon the reactivity levels within the fuel elements which comprise the core.

Fuel element reactivity is dependent upon the age of the individual fuel elements. Early in the fuel element life, reactivity levels are usually above some predetermined reference point and controlled by the manipulation of a plurality of neutron absorbing control rods. If, for example, the reactivity level within the reactor element is desired to be raised, the control rods are withdrawn a predetermined distance from within the core, thus increasing the neutron level within the core, thereby increasing the reactivity level within the core. With the reactivity level within the core increased, heat is generated within the reactor and therefore the heat content of the pressurized water coolant increases.

A higher coolant temperature increases the amount of heat transferred from the pressurized water coolant to the secondary water in the steam generator. The increased amount of heat transferred increases the pressure of the steam produced in the steam generator for use in the secondary or steam side. The ability to change steam pressure to change the overall electrical output of the power plant to meet the demand of the system is termed the load follow capability of the system. As is well known to those skilled in the art, the load follow capability of the system is inhibited during a xenon transient condition.

The useful life, or fuel cycle, of the fuel elements utilized by the reactor is measured in terms of certain predetermined parameters. Once such parameter is the amount of reactivity in excess of a certain predetermined reference level. This level of excess reactivity is above the reference level at the start of the fuel cycle, but the level of excess reactivity decreases toward the reference value as the fuel element is utilized. During the life of the fuel element, the decrease in excess reactivity is offset by the withdrawal of the neutron absorbing control rods, which permits the reactor to operate at its constant rated power levels.

The point in time denominated as the end of the fuel cycle is normally defined as that time when, with the control rods fully withdrawn and the overall system at full thermal load, the excess reactivity of the reactor core is zero. When these parameters are met, the end of the fuel cycle occurs, despite the fact that some residuum reactivity remains in the fuel elements. Of course, other parameters may be used to define at what point in time the end of the fuel cycle occurs.

When the reactor element operation nears the end of the fuel cycle, that is near the end of the useful life of the fuel element, even though there is still the residuum reactivity in the core, it has been observed that even total withdrawal of the control rods fails to sufficiently increase reactivity levels within the reactor to provide thermal output demanded by the electrical load. When reactivity decreases, the heat produced, or thermal output, within the core decreases. Decrease in thermal output of the reactor core due to decreased reactivity causes a concomitant lowering of water coolant temperatures. This in turn, decreases the amount of heat transfer in the steam generator. Thus, the thermal output of the steam generator is lowered, lowering the electrical output of the power plant as a whole.

It is well known to those skilled in the art that the density of the pressurized water coolant is dependent upon temperature of the coolant. As the temperature of the coolant decreases, the coolant becomes more dense. At the end of the fuel cycle, fissions of atoms within the fuel element still produce the residuum of reactivity noted above, but, the level of reactivity is not sufficient to maintain the rated thermal output of the reactor. The fissions produce both high energy and lower energy "thermal" neutrons. The thermal neutrons, although only a certain percentage of the neutrons released by the fission process, are important since they are required to enable the fission chain reaction to continue. Since the number of fissions, and therefore, the number of neutrons produced, is decreased at the end of the fuel cycle, and since only a predetermined percentage of neutrons produced are thermal neutrons, the reactivity, and hence the thermal output of the reactor, decreases.

However, since the pressurized water coolant becomes denser with a lower temperature, it is possible to increase the excess reactivity above the reference value by lowering coolant temperature. With coolant temperature lower, and the coolant more dense, more of the high energy neutrons produced by those fissions which provide the residuum reactivity will be slowed sufficiently to enable them to produce a fission. Thus, although the total number of neutrons released is not increased, the cooler, and therefore, denser, pressurized water coolant lowers the energy of enough high energy neutrons to provide enough thermal neutrons to sustain a fission chain reaction. In this way, the reactivity of the core is increased over the reference reactivity value, thus enabling the core to maintain its rated thermal output. The increase in excess reactivity thus offsets the loss of reactivity attendant upon the end of the fuel cycle.

However, decreases in coolant temperature have a deleterious effect upon pressure of the steam in the turbine side. In order to increase excess reactivity, without diminishing steam pressure, the prior art has to either insert a new fuel element or enrich the old fuel element. However, a further alternative which can maintain the reactivity at an excess level above the reference and the thermal output at its rated level, and yet still maintain the electrical output of the entire system within a predetermined close range of values to the rated electrical output is needed.

SUMMARY OF THE INVENTION

This invention relates to a central system which extends the life of a fuel element of a pressurized water reactor beyond the end of a predetermined fuel cycle and to a method of improving the operation of a nuclear steam power plant having a pressurized water reactor therein. The control system extends the life of the fuel elements beyond the end of the fuel cycle without a diminution in the thermal output of the reactor and with a diminution in the electrical output of the system within only a small predetermined range of values.

The control system utilizes temperature sensing means to indicate that the reactor element is unable to maintain or raise the temperature of a primary coolant to produce steam pressure sufficient to meet a load demand upon the overall system. A predetermined signal from the temperature sensing means initiates flow interruption means which provide an appropriate steam system response. The response will be to maintain the plant output as high as possible with the load of steam pressure conditions by utilization of one or more flow interruption modifications within the steam system. This permits the plant to maintain electrical output within a close range of the rated output over an extended fuel cycle.

The method for improving the operation of the nuclear steam power plant having the pressurized water reactor element therein comprises the steps of increasing reactivity levels within the reactor core to maintain the reactivity level at its constant rated value, and modifying the turbine system associated with the pressurized water reactor element to compensate for the increase in reactivity levels within the reactor core.

In addition to extended fuel cycle application, utilization of the control system or method taught by this invention provides an improved load follow capability for the reactor element when operating during a xenon transient condition.

Although the control system and method to improve reactor operation can be utilized at any time during operation of the system, they are most advantageously employed if initiated during a xenon transient condition or at the end of the fuel cycle.

BRIEF DESCRIPTION OF THE DRAWINGS

The invention will be more fully understood from the following detailed description taken in connection with the accompanying drawings, in which.

DESCRIPTION OF THE PREFERRED EMBODIMENTS

Figure 1:
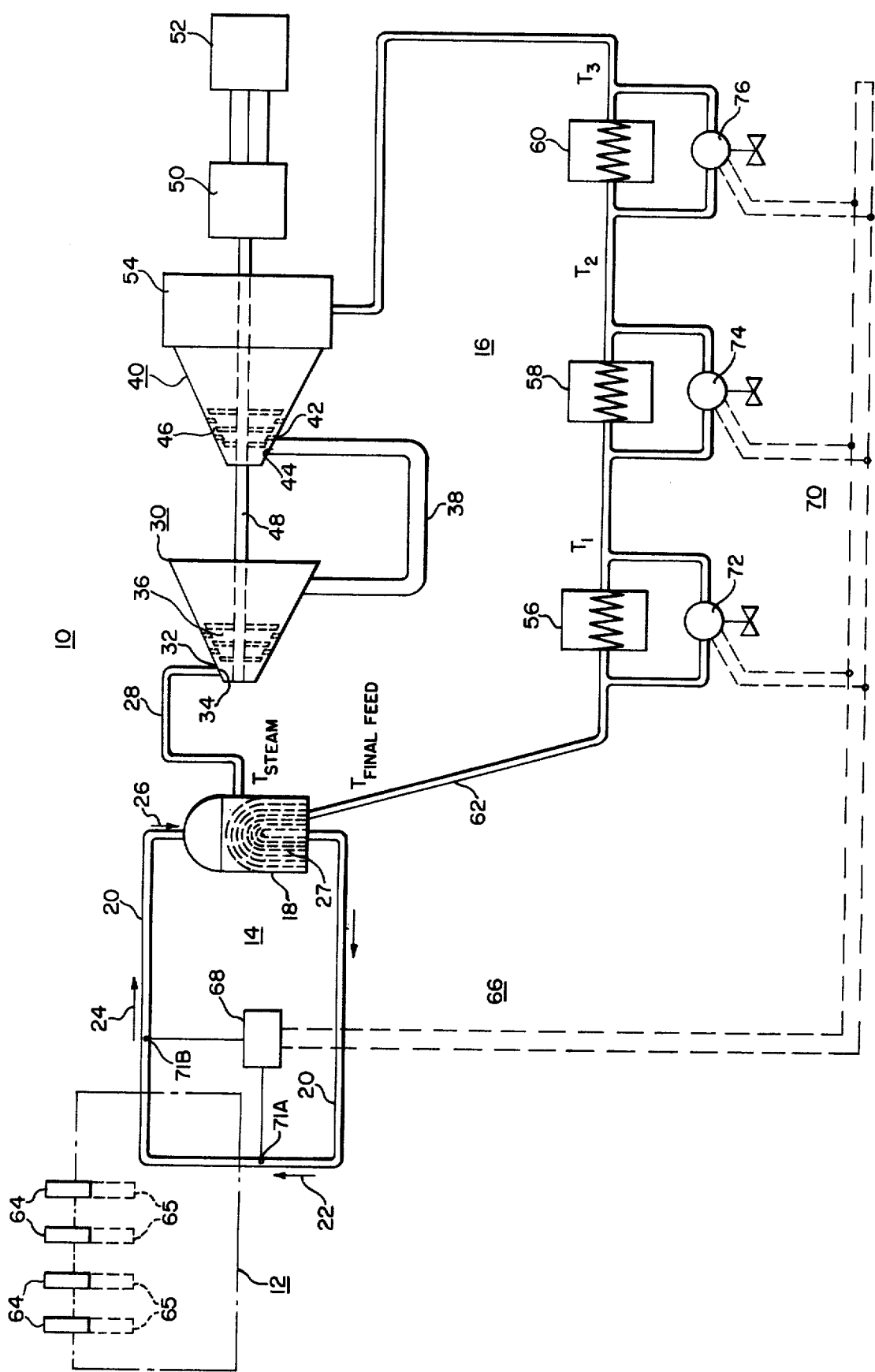
FIG. 1 is a diagrammatic view illustrating a pressurized water reactor power plant embodying a control system taught by this invention.

Throughout the following description, similar reference characters refer to similar elements in all Figures of the drawing.

Referring now to FIG. 1, a diagrammatic view of a nuclear steam power plant 10 utilizing one embodiment of the invention is shown. In FIG. 1, the nuclear power plant 10 comprises a pressurized water reactor element 12, a closed primary side or loop 14, and a closed secondary side or loop 16. A steam generator, or heat exchanger, element 18 is common to both the primary closed loop 14 and the secondary closed loop 16.

In the primary loop 14, the pressurized fluid coolant is conducted within a conduit member 20 into the nuclear reactor element 12, as illustrated by reference arrow 22. The pressurized water coolant passes through the core of the nuclear reactor element 12 and takes heat therefrom. The heated pressurized fluid water coolant exits the reactor element 12 as illustrated by reference arrow 24. Since the water coolant within the conduit 20 is maintained at a high pressure approximately 2200 p.s.i., the heat transferred thereto within the core of the reactor element 12 is not sufficient to raise the temperature of the pressurized water coolant within the conduit 20 above the vaporization temperature of water at the appropriate pressure.

Thus the heated, but not boiling, pressurized water coolant is conducted into and through the steam generator element 18, as illustrated by the reference arrow 26. Within the steam generator element 18, the pressurized water coolant passes through a tube bundle 27 and the heat carried by the pressurized water coolant is transferred to a mass of secondary water disposed within the steam generator element 18. Thus, secondary water disposed within the steam generator element 18 is converted into dry and saturated or low superheat steam for use in the secondary or steam side loop 16.

After transferring its heat content to the secondary water within the steam generator element 18, the pressurized water coolant, now at a much lower temperature, is reintroduced into the reactor core to complete the primary loop 14.

In the secondary or steam system 16, the steam produced within the steam generator element 18 is conducted through a conduit element 28 into a high pressure turbine element 30. The high pressure turbine element 30 has an inlet orifice 32 having a predetermined physical dimension 34. It is seen that the rate of flow into the high pressure turbine element 30 is dependent upon the physical dimension 34 of the inlet orifice 32.

After passing through a plurality of rotating and stationary blades 36, the steam is discharged from the high pressure turbine element 30 and enters through a conduit 38 into a low pressure turbine element 40. The low pressure turbine element 40 has an inlet orifice 42 having a predetermined physical dimension 44. The physical dimension 44 of the low pressure turbine element 40 is greater than the physical dimension 34 of the high pressure turbine element 30.

Steam introduced into the low pressure turbine element 40 passes through a plurality of rotating and stationary blades 46. It is to be understood that any number of intermediate pressure turbines may be disposed between the high pressure turbine element 30 and the low pressure turbine element 40. Although omitted for clarity, a turbine system utilizing such intermediate turbines is within the contemplation of this invention.

Passage of the motor fluid through the rotating and stationary blades 36 and 46 within the high pressure turbine 30 and the low pressure turbine element 40 respectively, converts the heat energy carried by the motive fluid into rotating mechanical energy which causes a shaft 48 to rotate an electrical generator 50 to produce electrical energy. The electrical energy produced by the generator 50 is supplied to an associated electrical load 52.

Steam exhausted from the low pressure turbine element 40 is collected and condensed within a condenser element 54. The condenser 54 returns steam condensate in a liquid state through a series of feedwater heater elements 56, 58 and 60. Although more feedwater heater elements may be disposed within the system, only feedwater heaters 56, 58 and 60 are illustrated for clarity. The feedwater heater elements 56, 58 and 60 progressively raise the temperature of the condensate passing therethrough.

When the secondary water is reintroduced into the steam generator element 18, through a conduit 62, the condensate enters the steam generator element 18 having a predetermined temperature, indicated $T_{final\ feed}$ in the drawings. It is also apparent that the steam produced within the steam generator 18 and entering the steam side 16 through the conduit 28 has a predetermined temperature $T_{steam}$. The temperature and pressure of the steam entering the steam side 16 through conduit 28 is associated with the amount of heat transferred within the steam generator 18.

It is apparent from FIG. 1 that the amount of steam produced within the steam generator 18 is dependent upon the temperature of the pressurized water coolant carried within the conduit 20. Further, it is also apparent that the temperature of the pressurized water coolant within the conduit 20 is directly dependent upon the temperature of the core of the nuclear reactor element 12. Thus, it may be said that the amount of steam produced within the steam generator 18, and the pressure of the steam therein produced, is directly dependent upon the temperature of the pressurized water coolant within the primary loop 14 and indirectly dependent upon the temperature of the nuclear reactor element core 12.

Referring to the secondary or steam side loop 16, it is also clear that the rate of flow of the steam produced from the steam generator 18 through the turbine elements 30 and 40 is dependent upon the physical dimension 34 of the inlet orifice 32 to the high pressure steam turbine element 30.

It is to be emphasized that although the pressurized water coolant carried within the primary loop 14 is radioactive, the motive fluid flow within the secondary or steam side loop 16 is not radioactive. This is so because the pressurized water coolant carried within the primary loop 14 is exposed to an intensive bombardment of high energy neutron particles within the reactor core 12, thus increasing the level of radioactivity within the pressurized primary coolant fluid. However, the radioactivity carried by the pressurized water coolant is not transferred to the secondary water within the steam generator 18, simply because the pressurized water coolant is physically segregated from the secondary water in the steam generator 18 by the tube bundle 27. Thus, it is physically impossible for the secondary water and the steam produced thereby for use in the steam side loop 16 to be radioactive.

The heat generated within the reactor core 12, commonly called the thermal output of the reactor 12, is dependent upon the reactivity levels of the fuel elements utilized within the reactor 12. The reactivity level of the fuel elements utilized within the reactor 12 is a function of the age of the fuel elements. Within the fuel cycle, or useful life of the fuel element, reactivity levels within the reactor 12 are normally quite high. The reactivity level within the reactor 12 is controlled by a plurality of neutron absorbing control rods 64 which are disposed within channels 65 within the reactor core 12. During the early portion of the fuel cycle, that is, early in fuel element life, the control rods 64 are usually extended fully within the channels 65. This is to permit the control rods 64 to maintain the neutron density within the reactor 12 at a predetermined level, thus controlling the fission processes occurring within the nuclear elements within the reactor 12.

As time progresses, increased reactivity can be brought about by the simple expedient of withdrawing control rods 64 a predetermined distance within each respective channel 65, thus increasing the density of the neutrons within the reactor core 12.

In addition, the pressurized water coolant serves as a further check to prevent a runaway condition within the reactor 12. As an inherent safety feature, if the reactivity level within the reactor 12 increases, the temperature of the pressurized water coolant would decrease. As an important corollary to that inherent stability feature, it will be observed that if the temperature of the pressurized water coolant decreases, the reactivity levels within the nuclear reactor 12 would increase.

It is thus seen that the reactivity levels within the reactor 12 control the thermal output of the reactor 12. The thermal output or heat generating capacity of the reactor 12 in turn, controls the temperature of the pressurized water coolant. The greater the temperature within the reactor 12, the more heat that is transferred to the pressurized water coolant. In turn, it is seen that the temperature of the pressurized water coolant controls the amount, and pressure level, of the steam produced within the steam generator element 18 and utilized within the steam side loop 16. Thus, the thermal output of the reactor 12 is essentially equal to the heat-transfer capability within the steam generator element 18, the difference existing therebetween owing to unavoidable heat losses in the pumping of the pressurized water coolant from the reactor 12 to the steam generator element 18. Of course, other heat losses can also diminish the heat content of the primary pressurized water coolant.

At the end of the fuel cycle, the control rods 64 have usually been withdrawn as far as possible within their respective channels 65. Thus, the reactivity level within the reactor 12 is no longer controllable by the expedient of withdrawing the control rods 64 from their channels 65. The decrease in reactivity of the reactor 12 due to the fuel depletion within the fuel elements at the end of the fuel cycle causes the reactor coolant temperature to decrease. It is seen that if this condition were permitted to continue, the steam pressure within the steam side 16 would decrease also, thus reducing the load capability of the overall power plant system 10. Such a consequence is especially detrimental if it should occur at a time when demand on the plant 10 is great.

It will be recalled however, that reactivity levels within the reactor 12 can be increased so as to maintain reactivity levels constant by decreasing the pressurized water coolant temperature. The coolant temperature can be lowered in various ways. For example, if the amount of steam drawn from the steam generator 18 into the steam side loop 16, were increased, the temperature of the pressurized water coolant would decrease. Similarly, lowering the temperature of the secondary water entering the steam generator 18 through the conduit 62 would lower the temperature of the pressurized water coolant. As will be made clear herein, each of these methods of lowering the temperature of the water coolant will provide a useful effect in the steam side loop 16.

However, lowering coolant temperature is not without its problems. For, to lower the temperature the pressurized water coolant in order to increase the reactivity and thermal output of the reactor element 12 would produce, as an unwanted side effect, a further reduction in the steam pressure within the secondary side 16.

The embodiment of the invention illustrated in FIG. 1 provides an effective control system 66 which permits the thermal output of the reactor 12 to be maintained at its rated capacity despite the reactivity loss due to fuel depletion at the end of fuel cycle. At the same time, the control system taught by this invention permits the overall output of the power plant 10 to remain within a close, predetermined range of values to the optimal overall plant electrical power output level.

It is well known to those skilled in the art, that within the secondary or steam side loop 16 the thermal output of the reactor 12 across the steam generator 18 is proportional within a constant to the product of the flow through the secondary or steam side loop 16 and the difference in enthalpy between the influent motive fluid entering the secondary loop 16 and the effluent motive fluid leaving the secondary loop 16.

Utilization of this equality relationship by the control system taught by this invention enables the reactor 12 to continue to operate at full rated thermal capacity beyond the end of the normal fuel cycle with small diminution in overall electrical power output. Of course, it is apparent that such an extension of fuel cycle operating life will be most economically advantageous.

It is then apparent that if the pressurized coolant temperature is reduced, the steam pressure levels within the steam side 16 are adversely affected. However, using the equality relationship between the thermal output across the steam generator and the product of the flow and the change in enthalpies within the steam side 16, it is possible that the steam side responses to the control system taught by this invention would maintain or raise the plant output as high as possible with the low steam pressure conditions extant.

In general, the reactor turbine control system 66 for the pressurized water reactor power plant 10 comprises temperature sensing means 68 for sensing the temperature levels within the reactor 12, and flow interruption means generally indicated at 70 for interrupting a predetermined portion of the motive fluid flow within the steam side 16. In the embodiment disclosed in FIG. 1, the temperature sensing means 68 monitors the temperature levels within the reactor 12 by sensing temperature levels within the primary coolant at a point 71A in the conduit 20 just before the coolant enters the reactor 12 and at a point 71B in the conduit 20 just after the coolant exits the reactor 12.

The flow interruption means comprise a plurality of bypass lines having valves 72, 74 and 76 therein which respectively valve the individual feedwater heaters 56, 58 and 60 out of service.

The effect of this embodiment of the invention is as follows. Since the temperature of the pressurized water coolant must be reduced in order to increase the reactivity levels within the reactor core 12 so that the thermal output of the reactor 12 can be maintained constant at its predetermined rated value, it is apparent that the steam pressure and the temperature of the steam entering the steam side loop 16 must be lowered. Recalling the equality relationship cited above, it will be noted that the thermal output across the steam reactor 12 is dependent upon the product of the flow into the steam side 16 and enthalpy differential within the steam side 16. Since the thermal output across the steam generator 18 is dependent upon the temperature of the water coolant flowing within the primary loop 14, and since this temperature of the pressurized coolant has been lowered in order to increase the reactivity level within the reactor 12, it is therefore apparent that to maintain the thermal output across the steam generator 18 and also satisfy the equality relationship that holds true within the steam side loop 16 either an increase in the flow rates within the steam side loop 16 or an increase in the quantity defined as the difference in influent and effluent enthalpies of the steam side 16 must be effected.

According to the teachings of this invention and the embodiment shown in FIG. 1, the thermal output across the steam generator 18 is maintained constant at its predetermined rated value due to the lowering of the pressurized coolant temperature. The constant thermal output in the steam generator 18 is compensated for by providing a greater difference in enthalpies between the enthalpy of the influent steam entering the steam side loop 16 through the conduit 28 and the enthalpy of the effluent condensate leaving the steam side loop 16 through the conduit 62. It is well known to those skilled in the thermo-dynamics art that enthalpy rates are primarily dependent upon the temperature of the fluid at the points in question.

Thus it is seen that the enthalpy differential between influent motive fluid and effluent motive fluid from the steam side loop 16 will be directly controlled by the temperature of the influent motive fluid, that is the steam temperature leaving the steam generator through conduit 28 and designated $T_{steam}$, and the temperature of the effluent motive fluid, that is the temperature of the condensate entering the steam generator 18 through the conduit 62 and designated $T_{final\ feed}$. It is seen that if the difference in temperature between $T_{steam}$ and $T_{final\ feed}$ is increased, the overall thermal equality of the steam side loop would be maintained. That is, in order to maintain the thermal output across the steam generator 18 constant due to the decrease in temperature of the pressurized water coolant flowing therethrough, an increase in the enthalpy difference must be effected. This is done by increasing the temperature difference between $T_{steam}$ and $T_{final\ feed}$.

It is seen by reference to FIG. 1, that the temperature $T_{final\ feed}$ on the output side of the feedwater heater element 56 is greater than the temperature $T_1$ which is the temperature of the condensate immediately before entry into the feedwater heater element 56. Thus, if the feedwater heater 56 could be effectively eliminated from the system, the temperature of the secondary water entering the steam generator element 18 through the conduit 62 could be lowered from $T_{final\ feed}$ to the temperature $T_1$. The control system taught by this invention accomplishes this purpose.

The temperature sensing means 68 indicates a predetermined decrease in the temperature within the reactor 12. The temperature sensing means 68 responds to the temperature decrease by sending a predetermined signal to the flow interruption means 70 which initiates action by the flow interruption means 70 to open the valve 72, bypassing the final feedwater heater 56.

The effect of the action by the turbine control means taught by this invention is that the temperature of the secondary water entering the steam generator 18 through the conduit 62 would be lowered from the temperature $T_{final\ feed}$ to the temperature $T_1$. The effect of the lowering of the temperature of the secondary water entering the steam generator is to provide a greater temperature difference between $T_{steam}$ and $T_{final\ feed}$ to compensate, in the equality relationship, for the maintenance of a constant thermal output across the steam generator 18.

Over a period of time, however, the action initiated by the turbine control means in valving-out the feedwater heater 56 loses its effectiveness. At this time, the temperature sensing means 68 will sense a further predetermined temperature decrease within the reactor 12, and emit a predetermined signal to the flow interruption means 70. The flow interruption means 70 responds by opening the valve 74 to effectively valve-out the feedwater heater element 58. Valving out the feedwater heater element 58 has the effect of introducing secondary water into the steam generator element 18 at the temperature $T_2$. $T_2$ is the temperature at which the condensed motive fluid enters the feedwater heater 58. The temperature $T_2$ is lower than the temperature $T_1$.

The effect of lowering the temperature of the secondary water introduced into the steam generator 18 through the conduit 62 from the temperature $T_1$ to a lower temperature $T_2$ would be to increase the temperature differences between $T_{steam}$ and $T_{final\ feed}$. To increase the difference in enthalpies between the influent and effluent motive fluid within the steam side loops 16 compensates for the lowered steam pressure within the steam side loop 16. Steam pressure is lowered due to the lowering of the pressurized water coolant temperature which is necessary to increase reactivity to maintain thermal output across the steam generator 18 at its rated value. As time goes on, operation within the extended fuel cycle further decreases the radioactivity levels within the reactor 12. The temperature sensing means 68 senses an even further predetermined temperature decrease within the reactor core 12. The temperature sensing means 68 emits a predetermined signal to the flow interruption means 70.

The flow interruption means 70 will respond to this third predetermined signal by opening the valve 76, to effectively valve-out the third feedwater heater 60. The effect of valving-out of the third feedwater element 60 is to introduce water at a temperature $T_3$ directly into the steam generator element 18. The temperature $T_3$ is lower than the temperature $T_2$.

In a manner similar to that described heretofore, differences between the temperature of secondary water introduced into the steam generator 18 through the conduit 62 and the temperature of the steam entering the steam side loop 16 at conduit 28 would increase, thus increasing the difference in enthalpies between the influent and effluent motive fluid within the steam side 16. Increasing the enthalpy difference will compensate for the maintenance of the thermal output across the steam generator 18 at a constant value due to the decrease in temperature of the pressurized water coolant.

It has been found from empirical observation that it is advantageous to valve-out only the three feedwater heaters 56, 58 and 60 that are disposed closest to the steam generator 18 in the manner described.

However, utilization of the teachings of this invention to bypass the feedwater heaters 56, 58 and 60 will permit the control system to extend the fuel cycle of the fuel element of the reactor core 12 approximately three weeks. During these extended three weeks the thermal output of the nuclear reactor 12 will be its rated value. The reactivity of the reactor 12 is increased by decreasing the temperature of the pressurized water coolant. However, decrease in the temperature of the pressurized water coolant has a drawback in that the pressure, and thus the steam flow, in the steam side loop 16 will be decreased concomitantly to the decrease within the temperature of the pressurized water coolant. However, since the equality relationship which governs the steam side indicates that the thermal output across the steam generator 18 is equal to the flow multiplied by the energy pickup in the system (enthalpy difference), the decrease in the pressure of the steam flow in the steam side loop 16 can be compensated for by increasing the difference between enthalpies of the influent and effluent motive fluids. The difference in enthalpies can be effectively increased by making the difference in temperature between secondary water entering the steam generator 18 through the conduit 62 and the temperature of the steam leaving the steam generator 18 through the conduit 28 to enter the steam side loop 16 as high as possible. In the embodiment shown in FIG. 1, this was accomplished by successive elimination of the feedwater heater elements 56, 58 and 60.

Figure 2:
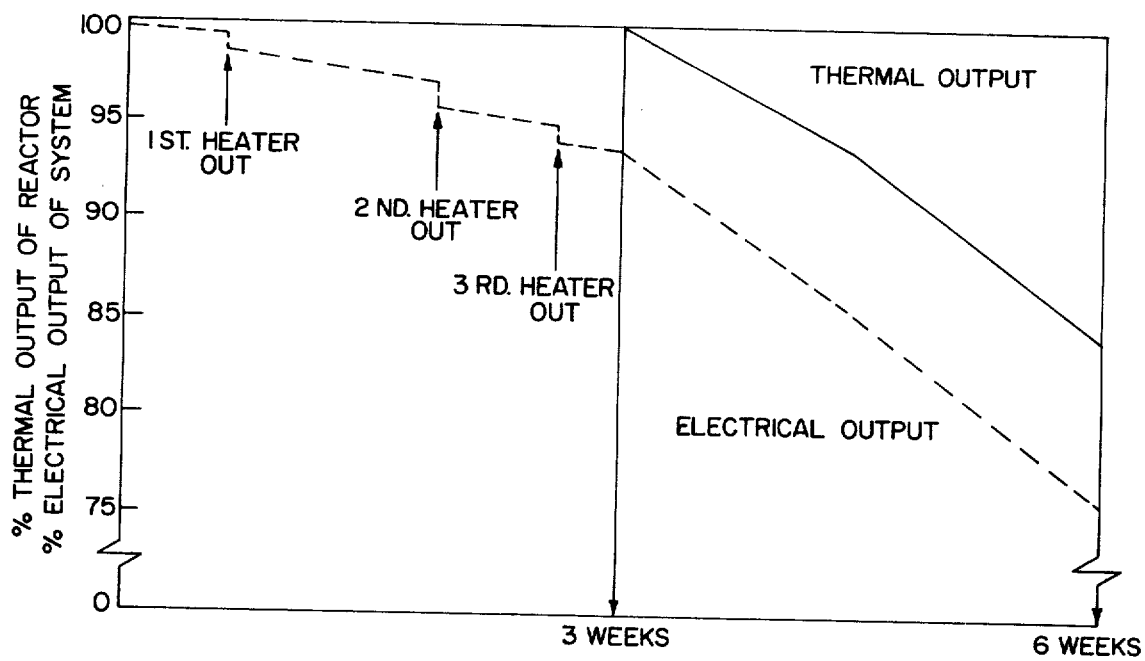
FIG. 2 is a graphical representation of the thermal output of the reactor element and the electrical power output of the entire system plotted against extended fuel cycle operation of a power plant utilizing the teachings of this invention.

Referring now to FIG. 2, a graphical representation of the effect of the control system embodiment illustrated in FIG. 1 and taught by this invention is illustrated. The ordinate in the graphical representation shown in FIG. 2 is a numerical percentage of the thermal output of the reactor 12 and the electrical output of overall power plant 10. The abscissa in the graphical representation of FIG. 2 is the time marked from the beginning of the extension of the fuel cycle within the reactor 12.

As stated above, decrease in reactivity within the reactor core 12 would lower the temperature of the pressurized water coolant. Lowering the temperature of the pressurized water coolant would decrease the pressure and temperature of the steam entering the secondary of steam side loop 16, thus causing a decrease in the electrical output of the overall power plant 10. This is graphically illustrated by the decreasing slope of the electrical output starting at time zero. Time zero represents the beginning of the extended fuel cycle. Beginning at time zero the electrical output is shown as decreasing from 100% rated power over the extended time period of fuel cycle operation.

However, utilization of the teachings of this invention and specifically the embodiment shown in FIG. 1 would, as is illustrated in FIG. 2, maintain the thermal output of the reactor at its rated level for 3 weeks of the extended period of fuel cycle operation. It is to be observed, however, that the electrical output of the entire power plant 10 decreases from a 100% of rated output to approximately 94% of its rated value during the first 3 weeks of extended fuel cycle operation. It is to be noted that step changes occur in the electrical output of the system 10 which coincide to the points in time when the feedwater heaters 56, 58 and 60 are respectively taken from service.

As was noted in conjunction with FIG. 1, elimination of each feedwater heater in turn produces a step change decrease in the temperature of the secondary water. Thus opening of the valve 72 to bypass the feedwater heater 56 causes a step change decrease in the temperature of the secondary water from the temperature $T_{final\ feed}$ to a lower temperature $T_1$.

Similarly, opening of the valve 74 in response to the flow interruption control means 70 and the elimination of the second feedwater 58 causes a step decrease in the secondary water from a temperature $T_1$ to the lower temperature $T_2$. Finally, opening of the valve 76 to effectively bypass the feedwater heater 60 causes a step decrease in the temperature of the secondary water from a temperature $T_2$ to the lower temperature $T_3$.

Throughout the step decreases over the first 3 weeks of extended fuel cycle, it will be observed from FIG. 2 that the thermal output of the reactor is maintained 100% of its rated value. However, as will be observed from FIG. 2, the electrical output of the overall power plant 10 only decreases over the 3 weeks of extended cycle from 100% of rated value to approximately 94% of rated value.

The three abrupt step decreases in electrical output as shown in FIG. 2, coincide with the elimination of each particular feedwater heater 56, 58 and 60 from the system.

After elimination of the third and final feedwater heater element from the system both the thermal output of the reactor and electrical output of the system decrease more rapidly. However, since the thermal output of the reactor decreases to approximately 85% of rated value, the electrical output of the plant 10 only decreases to 75% of rated value, the plant 10 may continue to operate in the extended fuel cycle period for up to 6 weeks.

It is obvious to anyone skilled in the art that such an extension of the fuel cycle during the period of time created by the phasing out of successive feedwater heater elements can have the effect of producing fuel cycle cost savings.

The extension of fuel cycle life during which the thermal output of the reactor was maintained at a 100% of its normal value was brought about by decreasing the reactor coolant temperature which provided the additional reactivity necessary for the extended fuel cycle operation. At the same time, the thermal output across the steam generator 18 is maintained at its rated value by successively increasing the quantity defined by the temperature difference between the temperature of the steam entering the steam side loop 16 and the temperature of the secondary water being reintroduced into the steam generator 18. Increasing the quantity defined by such temperature difference compensated for any pressure decrease of the steam flowing in the steam side loop 16 engendered by the decrease in temperature of the primary pressurized water coolant.

Figure 3:
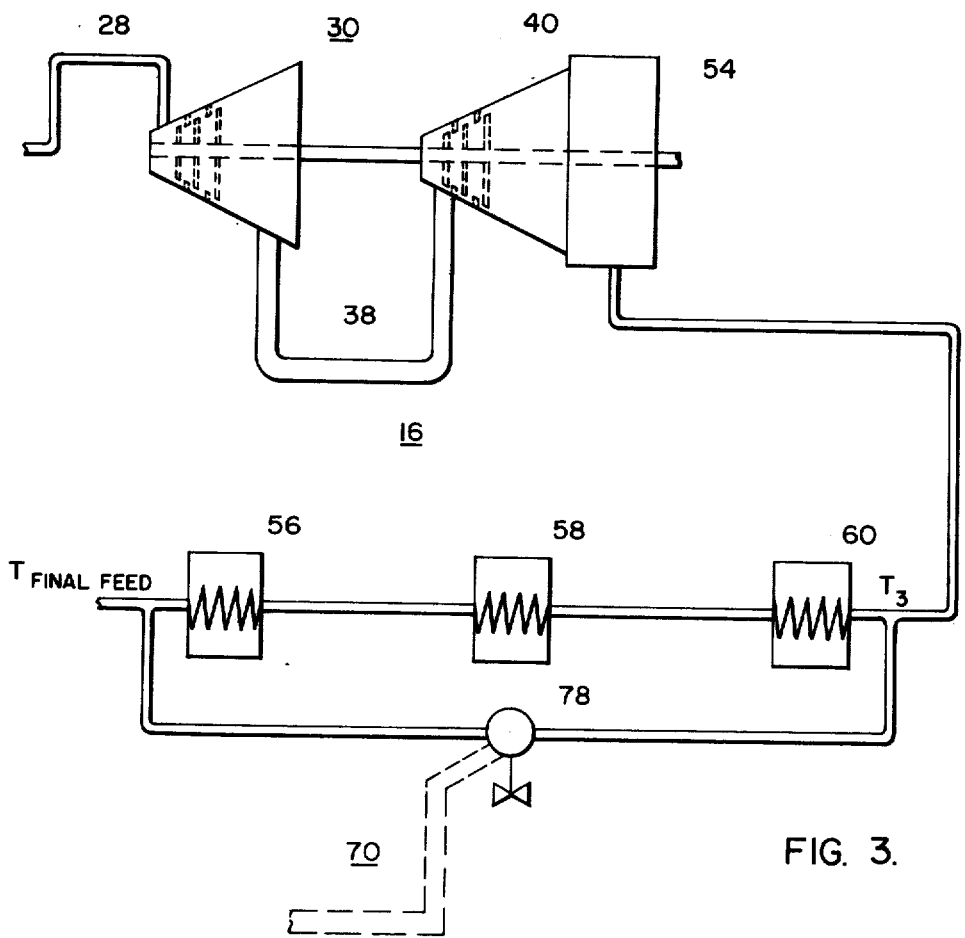
FIG. 3 is a diagrammatic view of a portion of a pressurized water reactor nuclear steam power plant showing another embodiment of the invention.

Referring now to FIG. 3, an expanded view of a portion of the steam system side 16 of FIG. 1, showing a second embodiment of the invention, is illustrated. In this embodiment of the invention, the flow interruption means 70 contains a single valve 78 bypassing at least the final three feedwater heaters 56, 58 and 60 disposed between the condenser 54 and the steam generator element 18.

In this embodiment of the invention, the temperature sensing means 68 (FIG. 1), again detects a predetermined temperature decrease within the reactor element 12. The temperature sensing means 68 then directs a predetermined signal to the flow interruption means 70. The flow interruption means 70 opens the valve 78 to bypass the three feedwater heaters 56, 58 and 60.

The effect of the opening of the valve 78 by the flow interruption means 70 is to lower the temperature of the final feed introduced into the steam generator element 18 from the temperature $T_{final\ feed}$ to the lower temperature $T_3$. The embodiment illustrated in FIG. 1 provides a step change temperature drop as each of the successive feedwater heaters 56, 58 and 60 are valved out of operation. With the embodiment illustrated in FIG. 3, the step temperature changes attendant upon the configuration of FIG. 1 are eliminated.

In the embodiment illustrated in FIG. 3, a gradual temperature change starting at temperature level equal to $T_{final\ feed}$ and gradually approaching temperature $T_3$ is experienced.

Again however, the final net effect of bypassing the feedwater heaters 56, 58 and 60 is to increase the temperature difference between the temperature of the steam entering the closed loop 16 and the temperature of the secondary water being introduced into the steam generator unit 18. The increase in temperature difference will cause a concomitant increase in enthalpy differences to maintain the thermal output across the steam generator 18 at its predetermined rated value.

Figure 4:
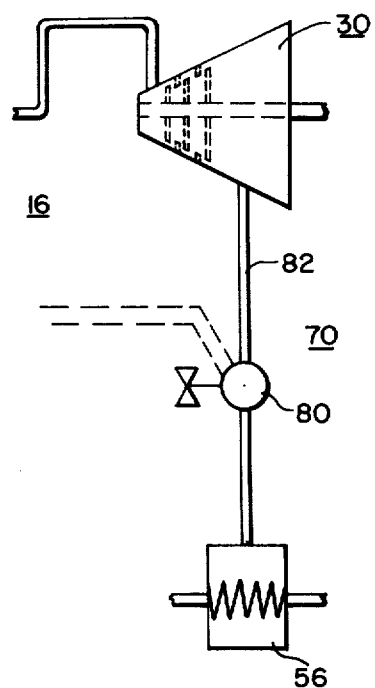
FIG. 4 is a diagrammatic view similar to FIG. 3 showing still another embodiment of the invention; and, FIG. 5 is a diagrammatic view similar to FIG. 3 showing a portion of a pressurized water reactor nuclear steam power plant illustrating still another embodiment of the invention.

Referring now to FIG. 4, a diagrammatic view of a portion of the closed steam side loop 16, similar to FIG. 3, illustrating another embodiment of the invention is shown. In FIG. 4, the flow interruption means 70 comprises a valve 80 disposed within an extraction line 82 between the high pressure turbine element 30 and the feedwater heater element 56.

When the temperature sensing means 68 experiences a predetermined temperature decrease within the reactor element 12, a predetermined signal is sent to the flow interruption means 70. The flow interruption means 70 responds by closing the extraction line 82 between the high pressure turbine element 30 and feedwater heater element 56.

By closing the extraction line 82, the source of heat for the feedwater heater 56 is eliminated, and the condensate which passes through the feedwater heater 56 is not heated. Thus, the temperature of the condensate entering the steam generator 18 through the conduit 62 is decreased over a period of time to $T_1$. The effect of the embodiment shown in FIG. 1 and the embodiment shown in FIG. 4 are similar. Namely, the temperature of the secondary water being introduced into the steam generator 18 is reduced from $T_{final\ feed}$ to $T_1$, a lower value. However, in the embodiment shown in FIG. 4, the feedwater heater 56 is maintained in the system as opposed to being bypassed by operation of the valve 72 (FIG. 1).

Figure 5:
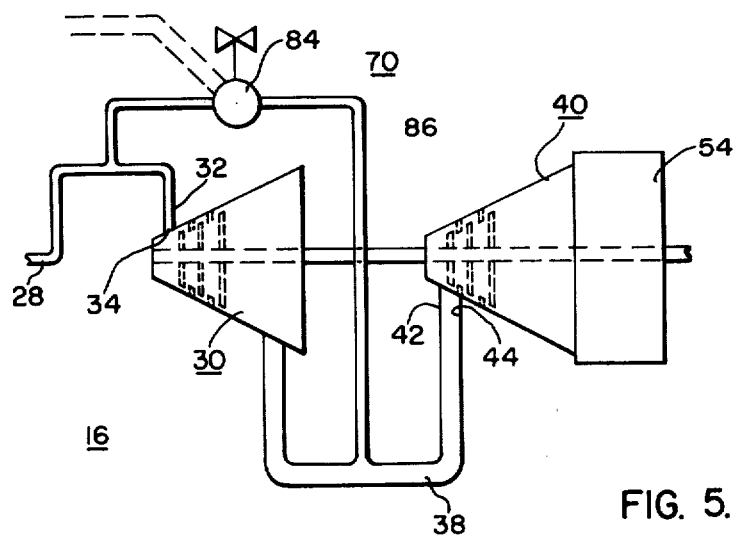

Referring now to FIG. 5, a diagrammatic view illustrating yet another embodiment of the invention is shown. In this embodiment of the invention, the flow interruption means 70 comprises a valve 84 disposed in a bypass conduit 86 which bypasses the high pressure turbine element 30. It will be recalled from the equality relationship which governs the steam side closed loop 16 that the thermal output of the steam generator 18 is dependent upon the product of the steam flow through a closed steam loop 16 and the difference enthalpies between the influent motive fluid and the effluent motive fluid from the closed loop 16.

In the embodiments of the invention that have been described heretofore, the method of compensating for the decrease in the pressure of the steam in the steam side loop 16 due the lowering of the temperature of the primary pressurized water coolant has been to increase the difference in enthalpies between the influent and effluent motive fluid.

In each case, the enthalpy difference was increased by increasing the temperature difference between the steam entering the closed loop 16 through conduit 28 and the temperature of the secondary water being reintroduced into the steam generator 18 through conduit 62.

In this embodiment of the invention, the flow parameter in the above-mentioned equality relationship is increased to compensate for the pressure decrease in the steam loop 16 engendered by the decrease in temperature of the primary water coolant.

The high pressure turbine element 30 has an inlet orifice 32 with a predetermined physical dimension 34 which is less than the physical dimension 44 of the inlet orifice 42 of the lower pressure turbine element 40. In this embodiment of the invention, the flow parameter through the steam side loop 16 is increased by bypassing around the smaller dimension 34 in the inlet orifice 32 in the high pressure turbine element 30.

Since the physical dimension 44 of the orifice 42 in the low pressure turbine element 40 is larger than the physical dimension 34 of the inlet orifice 32 of the high pressure turbine element 30, the flow rate through the closed steam side loop 16 increases concomitantly. An increase in the flow rate parameter through the steam side loop 16 compensates for the loss of steam pressure in the steam side loop 16 which results from the lowering of the pressurized water coolant temperature.

It is thus seen that each embodiment of the invention has as its effect the increase in either the flow rate parameter or the change-enthalpy parameter to maintain the thermal output across the steam generator 18 due to the decrease in the pressurized water coolant temperature. It will be recalled that the temperature of the pressurized water coolant in the primary loop 14 is decreased in order to increase the reactivity rate within the reactor 12, to maintain the reactor 12 at its rated thermal output during extended fuel cycle operation.

During normal operation, that is, during the normal fuel cycle of the reactor 12, the reactor 12 is called upon to decrease reactivity levels within the reactor 12 during those periods when there is a decreased demand upon the overall power plant 10. During these times, the reactivity level of the reactor 12 is decreased by inserting the neutron absorbing control rods 64 in their respective channel 65 from within the reactor 12. This decreases the density of high energy neutrons within the reactor 12, thus decreasing the reactivity within the reactor 12. Decreasing reactivity in turn decreases the reactivity level of the reactor 12. If the temperature of the reactor 12 decreases, the temperature of the coolant also decreases, thus decreasing the pressure of the steam passing through the second steam side loop 16.

In this way, the power plant 10 is able to decrease its capacity during off-peak load periods. The capability of the reactor power plant 10 to decrease its electrical output during off-peak load periods is characterized as the load follow capability of the reactor power plant 10.

However, during operation of the reactor 12 during these off-peak load periods, a quantity of xenon is produced within the reactor 12. The presence of the xenon within the reactor 12 inhibits the load flow capability of the system.

It has been observed that load flow capability of the system is inhibited until the xenon within the reactor 12 is given time to decay. In the prior art, the only alternative available during periods of xenon decay, or during the so-called xenon transient period, is to allow the xenon to decay and thus to hinder the load follow capability of the system 10 during this time.

However, an added feature of this invention provides a second alternative during xenon transient period. For a system using the teachings of this invention, load follow capability can be maintained even during the xenon transient period.

If, for example, full power capability must be restored during a xenon transient period, the reactivity level within the reactor 12 is increased by decreasing the temperature of the coolant in the reactor 12. However, this has the effect of lowering the pressure of the steam utilized in the closed steam side loop 16. It will be recalled, however, precisely that this same phenomenon occurred during the extended operation beyond the fuel cycle of the fuel element. That is, during extended operation the temperature of the pressurized water coolant is decreased in order to maintain reactivity levels within the reactor 12 at a predetermined level. During those times the electrical output of the overall system 10 was maintained within a very close range of its maximum efficient output.

The same reactor and system responses are found in a system undergoing a xenon transient. By lowering the temperature of the coolant, and compensating for lower temperatures of the pressurized coolant by changing either enthalpy differences or flow rates within the closed steam side loop, load follow capability, which is normally inhibited during the xenon transient period, can be restored.

Some efforts have been made to extend the lives of fuel cycles utilized in conjunction with the Boiling Water Reactor power plants. It is to be emphasized however, that the principle under which a Boiling Water Reactor operates is basically different from the principle under which the Pressurized Water Reactor operates.

The Boiling Water Reactor, by its very nature, must produce steam at a constant pressure. Constant pressure steam production is necessary since the steam pressure has a strong effect upon the reactor power; a steam pressure decrease causes a reactor power decrease. To control this effect the BWR output must be either raised or lowered before the turbine can draw more or less steam. As well known to those skilled in the art, the turbine is a slave to the reactor.

Beyond the end of the fuel cycle, the thermal output of the Boiling Water Reactor can be maintained constant by reducing the feedwater temperature. With a lower feedwater temperature and the same reactor power, less steam is produced. The steam pressure is held constant by manually closing the inlet orifices to the high pressure turbine 30 to reduce the area through which the flow must pass, thus increasing the flow pressure. By employing modifications to the steam side system, a Boiling Water Reactor power plant can extract more energy than normal from a reduced steam flow, returning the feedwater at a lower temperature.

However, no integrated control system for the steam system modification for a BWR has been previously utilized. Operation in the manner above described for a Boiling Water Reactor is a manual operation and is not considered normal within the context of the Boiling Water Reactor.

Conversely, a Pressurized Water Reactor, with which the teachings of this invention are embodied, permits variation in steam pressure. The turbine can draw more or less steam to meet load changes and the reactor will be raised or lowered to meet the steam demands. That is, the reactor is a slave to the turbine.

Beyond the end of the fuel cycle, the coolant temperature decreases to produce a decrease in steam pressure. This decrease in steam pressure is characteristic not only by operation beyond the end of the fuel cycle, but also by operation under large load increases. Whenever there is insufficient reactivity in the core to raise the reactor power and coolant temperature to meet steam conditions required by the turbine, steam pressure decreases.

The basic differences between a Boiling Water Reactor and a Pressurized Water Reactor for extended fuel cycle operation can be summarized as follows. The Boiling Water Reactor requires a feedwater temperature reduction to maintain full thermal power at a steam pressure which must be held constant. A Pressurized Water Reactor can maintain full thermal power by accepting a steam pressure decrease independent of the feedwater temperature reduction. At a lower steam pressure, the steam flow through the pressurized water reactor turbine system becomes restricted. Feedwater temperature in a pressurized water reactor can then be reduced to maximize plant electrical output and reduce the steam flow while the reactor operates at full thermal power.

It is thus seen that utilization of the teachings of this invention will provide a control system to maintain the steam power plant within a close range to the predetermined rated level. It is also seen that utilization of the control system embodying the teachings of this invention provides a method to maintain the thermal output of a reactor element constant despite the loss of reactivity within the core that is characterized by operation beyond the fuel cycle or during periods of increase low demand. It is further seen that utilization of the teachings of this invention will provide a method of continuing the load follow capability of the pressurized water reactor during periods of decay of accumulation of xenon.

We claim as our invention:

1. A control system for a nuclear steam turbine power plant having a pressurized water reactor element and a steam generator element supplying a flow of pressurized steam to a closed loop turbine arrangement, said control systems comprising:
   temperature sensing means for monitoring the temperature levels within said nuclear reactor, and
   flow interruption means for diverting a portion of said flow of pressurized steam in response to a predetermined signal from said temperature sensing means to change reactor power.

2. The system of claim 1, wherein said temperature sensing means transmit said predetermined signal to said flow interruption means when said temperature level within said reactor elements decreases a predetermined amount from said first predetermined temperature level.

3. A control system for a nuclear steam turbine power plant having a pressurized water reactor element and a steam generator element supplying a flow of pressurized steam to a closed loop turbine arrangement, said closed loop turbine arrangement having a high pressure turbine element and a low pressure turbine element, said control system comprising:
   temperature sensing means for monitoring the temperature levels within said nuclear reactor, and,
   flow interruption means for diverting a portion of said flow of pressurized steam in response to a predetermined signal from said temperature sensing means, said flow interruption means comprising a valve member disposed in a conduit bypassing said high pressure turbine element, said flow interruption means opening said valve member in response to said predetermined signal from said temperature sensing means to conduct said flow of pressurized steam from said steam generator element through said bypass conduit directly into said low pressure turbine element, bypassing said high pressure turbine element.

4. The control system of claim 1, wherein said closed loop turbine arrangement has an extraction conduit extending between a high pressure turbine element and a feedwater heater element, and wherein said flow interruption means comprises a valve member disposed within said extraction conduit, said flow interruption means closing said valve member in response to a predetermined signal from said temperature sensing means.

5. The system of claim 1, wherein said closed loop turbine arrangement has a plurality of feedwater heater elements disposed in series between said turbine element and said steam generator element, and a conduit means bypassing said plurality of feedwater heater elements, and wherein said flow interruption means comprises a valve member disposed within said bypassing conduit member, said flow interruption means responding to a predetermined signal from said temperature sensing means by opening said valve member.

6. The system of claim 1, wherein said closed turbine loop arrangement comprises a first feedwater heater element connected between said turbine element and said steam generator, and a conduit member bypassing said first feedwater heater element and wherein said flow interruption means comprises a valve member disposed within said first bypassing conduit, said flow interruption means responding to a first predetermined signal from said temperature sensing means to open said first valve element.

7. The system of claim 6, wherein said turbine system comprises a second feedwater heater element disposed between said turbine element and said first feedwater heater element and a conduit member bypassing said second feedwater heater element and wherein said flow interruption means comprises a valve member disposed in said second bypassing conduit, said flow interruption means responding to a second predetermined signal from said temperature sensing means to open said second valve member.

8. The system of claim 7, wherein said closed loop turbine system comprises a third feedwater heater element disposed between said turbine element and said second feedwater heater element and a third conduit member bypassing said third feedwater heater element and wherein said flow interruption means comprises a third valve member disposed in said third bypassing conduit, said flow interruption means responding to a third predetermined signal from said temperature sensing means to open said third valve member.

9. A method for extending operation of a pressurized water reactor power plant beyond the end of a predetermined fuel cycle, the plant having a reactor element having a predetermined reactivity level therein, the plant having a turbine loop with a predetermined motive fluid flow rate therein associated with said reactor, the turbine loop including a high pressure turbine element passing a predetermined flow rate and a low pressure turbine element passing a greater predetermined flow rate, said method comprising the steps of:
   changing said reactivity level in said reactor element from said predetermined level to another predetermined level and,
   modifying the flow rate in said turbine loop to compensate for the change in reactivity level in said reactor by bypassing said high pressure turbine element.

10. A method for extending operation of a pressurized water reactor power plant having a first closed reactor loop and a second closed turbine loop having a motive fluid therein beyond the end of a predetermined fuel cycle, said reactor loop having a pressurized water reactor element with a first predetermined reactivity level therein, said method comprising the steps:
   changing said reactivity level in said reactor element from said first predetermined level to a second predetermined level to change the pressure of the motive fluid within said turbine loop, and,
   modifying said turbine loop by diverting said motive fluid flow therein to compensate for said change in motive fluid pressure generated by said change in said reactivity level within said reactor element.

11. The method of claim 10 wherein said closed reactor loop has a pressurized fluid coolant therein, said fluid coolant having a first predetermined temperature therein, said changing of reactivity level within said reactor element comprising the step of decreasing said temperature of said fluid coolant from said first predetermined temperature to a second predetermined temperature.

12. The method of claim 10 wherein said turbine loop has an influent motive fluid with a first predetermined temperature flowing thereinto and an effluent motive fluid having a second predetermined temperature flowing therefrom, said modification to said turbine loop comprising the step of increasing the difference between said temperature of said influent motive fluid and said temperature of said effluent motive fluid.

13. The method of claim 12, wherein said temperature difference between said temperature of said influent motive fluid and said temperature of said effluent motive fluid is increased by, the step of lowering the temperature of said effluent motive fluid from said second predetermined temperature to a third predetermined temperature.

14. The method of claim 13, wherein said turbine loop comprises a series connected arrangement of a high pressure turbine element having an extraction zone therein, a low pressure turbine element, a condenser, and a feedwater heater element, said feedwater heater element connected to said extraction zone through an extraction conduit, and wherein said temperature of said effluent fluid is lowered from said second predetermined temperature to said third predetermined temperature, by the step of closing said extraction conduit between said high pressure turbine extraction zone and said feedwater heater.

15. The method of claim 13, wherein said turbine loop comprises a series connected arrangement of a high pressure turbine element, a low pressure turbine element, a condenser element and a plurality of feedwater heaters, and wherein said temperature of said effluent fluid is lowered from said second predetermined temperature to said third predetermined, temperature by the step of bypassing said plurality of feedwater heaters.

16. The method of claim 15, wherein said turbine loop comprises a series connected arrangement of a high pressure turbine element, a low pressure turbine element, a condenser element and a first feedwater heater, a second feedwater heater, and a third feedwater heater, and wherein said temperature of said effluent motive fluid is lowered from said second predetermined temperature to said third predetermined temperature, by the steps of bypassing said first feedwater heater.

17. The method of claim 16, wherein said temperature of said effluent motive fluid is lowered from said third predetermined temperature to a fourth predetermined temperature, by the step of bypassing said second feedwater heater.

18. The method of claim 17, wherein said temperature of said effluent motive fluid is lowered from said fourth predetermined temperature to a fifth predetermined temperature, by the step of bypassing said third feedwater heater.

* * * * *